(12) United States Patent
Huang

(10) Patent No.: US 6,668,638 B2
(45) Date of Patent: Dec. 30, 2003

(54) ACTIVE VORTEX CONTROL WITH MOVEABLE JET

(75) Inventor: Xingzhong Huang, Gloucester (CA)

(73) Assignee: National Research Council of Canada, Ottawa (CA)

(*) Notice: Subject to any disclaimer, the term of this patent is extended or adjusted under 35 U.S.C. 154(b) by 16 days.

(21) Appl. No.: 10/153,591

(22) Filed: May 24, 2002

(65) Prior Publication Data

US 2003/0033865 A1 Feb. 20, 2003

Related U.S. Application Data

(60) Provisional application No. 60/293,174, filed on May 25, 2001, and provisional application No. 60/310,475, filed on Aug. 8, 2001.

(51) Int. Cl.[7] .......................... G01M 9/00; B64C 23/06; B64C 21/08
(52) U.S. Cl. .......................... 73/147; 244/199; 244/208
(58) Field of Search ................. 73/147, 170.01–170.15; 244/14, 207–209, 199

(56) References Cited

U.S. PATENT DOCUMENTS

| 3,997,132 A | * | 12/1976 | Erwin ........................ 244/199 |
| 4,884,772 A | | 12/1989 | Kraft ........................ 244/199 |
| 5,191,791 A | * | 3/1993 | Gerardi et al. ............ 73/178 R |
| 5,230,486 A | | 7/1993 | Patterson .................... 244/199 |
| 5,282,591 A | | 2/1994 | Walters et al. ............. 244/199 |
| 5,358,156 A | | 10/1994 | Rethorst ....................... 244/15 |
| 5,417,391 A | | 5/1995 | Savitsky et al. ............ 244/199 |
| 5,676,333 A | | 10/1997 | Rethorst ....................... 244/15 |
| 5,743,493 A | | 4/1998 | McCaughan ................ 244/130 |
| 5,794,887 A | | 8/1998 | Komerath et al. ............ 244/75 |
| 5,813,625 A | * | 9/1998 | Hassan et al. ........... 244/17.11 |
| 6,138,955 A | * | 10/2000 | Gutmark et al. ............ 244/199 |

OTHER PUBLICATIONS

"Research into vortex breakdown control", Anthony M. Mitchell et al., Progress in Aerospace Sciences, 37 (2001), pp. 385–418.

"Delay of vortex breakdown over a delta wing via near–core blowing", S. Guillot et al., Dept. of Mechanical Engineering, Louisiana State University, Baton Rouge, LA 70803, pp. 1–9.

* cited by examiner

Primary Examiner—Edward Lefkowitz
Assistant Examiner—Jermaine Jenkins
(74) Attorney, Agent, or Firm—Marks & Clerk

(57) ABSTRACT

In a method of controlling vortex breakdown on an aerodynamic surface, a vortex generated by the aerodynamic surface is continually monitored to identify a non-linear region where vortex breakdown occurs. A fluid jet is blown into the non-linear region to displace the vortex breakdown to a target location. A blowing parameter for the fluid jet is continually adjusted to continually direct the fluid jet into the vortex breakdown region and preferably ensure maximum positive feedback. The fluid jet is dynamically displaced toward the sensitive spot to maximize the effectiveness of the jet.

27 Claims, 12 Drawing Sheets

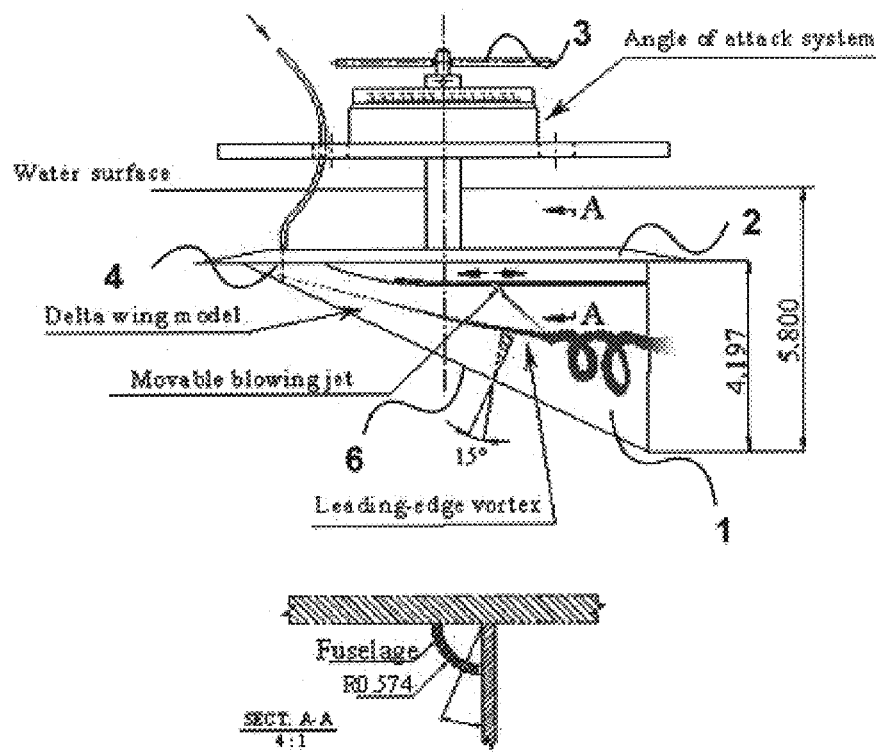
FIG. 3c
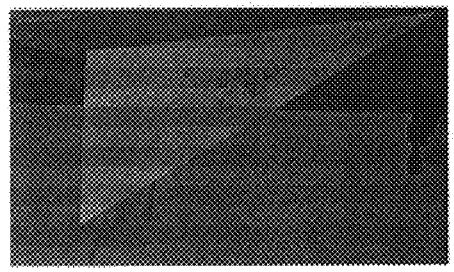 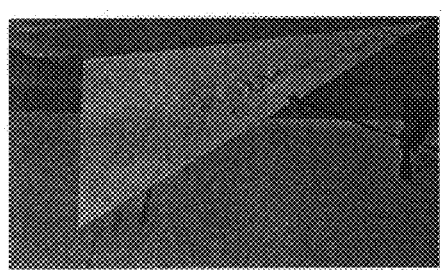
FIG. 4a FIG. 4b

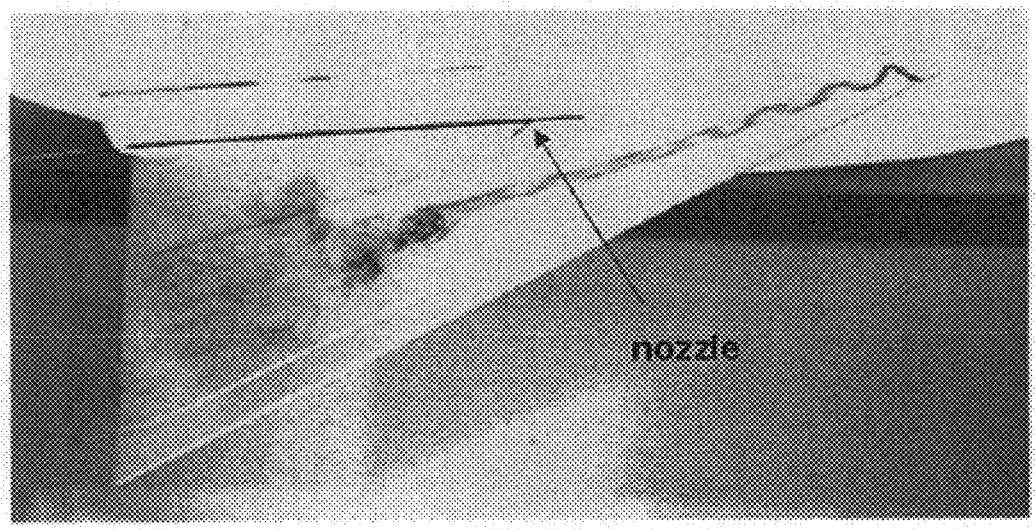
9a   No blowing
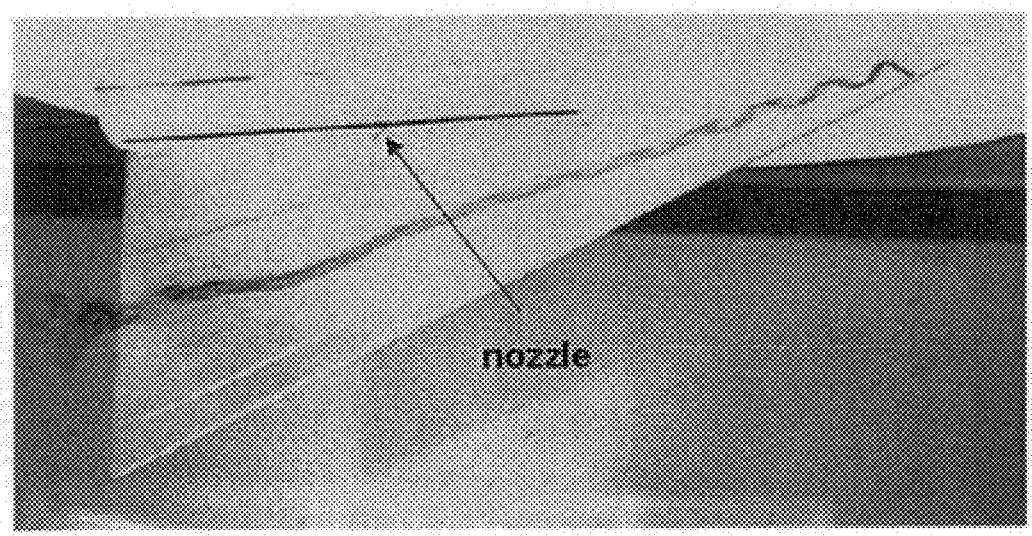
9b   with moveable blowing

ACTIVE VORTEX CONTROL WITH MOVEABLE JET

CROSS REFERENCE TO RELATED APPLICATIONS

This application claims the benefit under 35 USC 119(e) of provisional applications Nos. 60/293,174, filed May 25, 2001 and 60/310,475 filed Aug. 8, 2001.

BACKGROUND OF THE INVENTION

1. Field of the Invention

This invention relates to the field of aerodynamics, and in particularly to a method of controlling leading-edge vortex breakdown in high performance air vehicle.

2. Description of Related Art

The new generation of high-performance combat aircraft operates at high incidence and high angular rates. Under these flight conditions the airflow over the control surfaces is dominated by leading-edge vortices, which are exploited to obtain extra aerodynamic forces that help expand the performance envelope and thus gain tactical advantage in combat.

However, leading-edge vortex breakdown causes severe airload non-linearities and time dependence as well as highly unsteady flow downstream of the breakdown point. Control of leading-edge vortex behavior is of vital importance for enhancing maneuverability, which is reflected by the considerable research on potential active and passive control methods currently under way. By modifying vortex behavior, it is in principle possible to replace or complement conventional control surfaces, with their inherent limitations in this flight regime, with innovative active flow control concepts.

A number of different methods of flow control have been and are being investigated. For the purpose of controlling leading-edge vortex, only limited success has been achieved so far due to the unrealistic power requirement, low efficiency, complex structure and control method, etc.

Any method employed should meet the requirement of real applications, where the extra power required or engine bleed air must be minimized, yet the control methods must be effective in significantly altering the flow. The transfer function must be well behaved so that it can be incorporated into control laws and be simple and reasonably priced.

There are many methods aiming at controlling leading-edge vortex. Each method can also be used to control different phenomena, such as forebody vortex, boundary layer separation, and all kinds of vortex, either on the wing or over the wing as well as wing tip vortex and trailing vortex.

While there are many know such methods, one known method is to perform blowing, suction, or periodic blowing and suction. For example, U.S. Pat. No. 6,138,955 discloses the control of wind tip or trailing vortices, and in particular, blowing near the core at fixed location for arbitrary angle of attack or vortex breakdown location. At a blowing coefficient $C\mu=0.013$ the vortex breakdown location is delayed by 45% wing chord. This is also discussed in the paper by Guillot, S., Gutmark, E. J. and Garrison, T. J., "Delay of Vortex Breakdown over a Delta Wing via Near-Core Blowing," AIAA Paper 98-0315. Such methods involve blowing at a fixed location. They require huge blowing rates and unrealistic power requirements to result in significant delays in vortex breakdown.

SUMMARY OF THE INVENTION

According to the present invention there is provided a method of controlling flow field on aerodynamic surface, comprising blowing a fluid jet into, or sucking a fluid jet out of, a fluid flow adjacent said surface; continually identifying a sensitive spot in said fluid flow field near a vortex breakdown region, and dynamically displacing a source of said fluid jet toward said sensitive spot to enhance, and preferably maximize, the effectiveness of said fluid jet.

In another aspect the invention provides an arrangement for controlling an aerodynamic surface, comprising at least one pressure sensor for developing a signal identifying a non-linear region where vortex breakdown occurs; and a fluid jet generator for generating a fluid jet that can be blown into or sucked out of said non-linear region to displace said vortex breakdown to a target location, said fluid jet generator being continually displaceable along a path on said aerodynamic surface to direct said fluid jet toward a sensitive spot in said fluid flow field near the vortex breakdown region.

The sensitive spot is typically just upstream of the vortex breakdown location. The location of the vortex breakdown can be found with the aid of pressure sensors in a manner known per se in the art.

The source of the fluid jet is preferably a nozzle that moves along a defined path on the aerodynamic surface, typically a wing of an aircraft. Alternatively, the source can be a series of nozzles extending along the defined path. The nozzles are individually activated to displace the source of the fluid jet. A typical number of nozzles would be 7, with anywhere between 5 and 10 being optimum. The moveable source can be also provided by a system of pressure sensors and MEMS devices that act as actuators controlling a system of valves on the wing.

The invention employs a closed-loop method that is capable of keeping breakdown where desired. The control flow can be applied through the moving nozzle or sequentially through adjacent nozzles to force breakdown to almost any arbitrary position. Symmetric and differential shifting of the breakdown location can be used to control the normal force and rolling moment respectively with realistic control power. The location of the sensitive spot(s) can be found with pressure sensors.

The use of synthetic jets operating over a range of frequencies rather than constant blowing may also be used as a means to increase the proposed method's effectiveness.

Leading-edge vortex breakdown depends on the balance of vorticity feeding rate from the leading edge boundary-layer separation and its downstream convection rate. At the location where the convection rate is less than the feeding rate, the vortex core will be forced to become tilted. The titled vortex core introduces more unfavorable pressure gradient. This is a positive feed back resulting in the amplification of adverse pressure gradients and eventual breakdown of the vortex.

The invention is based in part on the discovery of the non-linear process of vortex breakdown. The inventors have discovered that the control power required to strengthen or destroy the vortex is a nonlinear function of the distance between the jet and breakdown locations and the orientation of the jet within the breakdown region. The key issue leading to the realistic jet power lies not in injecting the jet near the vortex core but, most importantly, in taking advantage of the nonlinear function and in finding sensitive spots in the flow field where low level blowing causes the breakdown point to move significantly so as to satisfy the aforementioned requirements in realistic applications.

If blowing is too far upstream of the breakdown or away from the nonlinear region, for example, compared with the global field, this imported energy is too small to have any effect on the global field and too little to affect the location of the breakdown. On the other hand, if the blowing point is too far downstream of the breakdown, it will take time and much energy for the large-scale turbulence flow back to an organized vortex.

The aerodynamic surface may be a delta wing, optimized for air vehicle maneuvering and just slightly upstream of the vortex breakdown location.

By maintaining the blowing location and orientation in the non-linear region of vortex breakdown where sensitive spots occur, the efficiency obtainable with the inventive method can be as much as ten times higher than that achievable with the prior art using a fixed source and yet the technique is simple and easy to apply in a practical situation.

The invention is applicable applied to super-maneuverable combat vehicles or the like.

Nomenclature

In the present description the following terms are employed:

$a_{jet}$ area of nozzle opening
b wing span
c root chord
$c_f$ feedback coefficient
$c_\mu$ $$\text{blowing coefficient} = \frac{a_{jet}}{s} \cdot \left(\frac{u_j}{U_\infty}\right)^2$$

$e_b$ blowing effectiveness
r radial distance
Re Reynolds number based on wing root chord
s wing planform area
$U_\infty$ free stream velocity
$U_j$ jet velocity at the nozzle
$U_x$ axial component of velocity
$U_\theta$ azimuthal component of velocity
$U_r$ radial component of velocity
$X_b$ chordwise location of blowing jet
$x_b$ non-dimensional blowing location $$x_b = \frac{X_b}{c}$$

$X_{VB}$ chordwise vortex breakdown location
$x_{VB}$ non-dimensional vortex breakdown location $$x_{VB} = \frac{X_{VB}}{c}$$

α angle of attack
β sideslip angle
τ convection time $$\tau = \frac{c}{U_\infty}$$

$\omega_x$ axial component of vorticity
$\omega_\theta$ azimuthal component of vorticity

BRIEF DESCRIPTION OF THE DRAWINGS

The present invention will now be described in more detail, by way of example only, with reference to the accompanying drawings, in which;

FIG. 1a is a perspective view of a super-maneuverable combat vehicle or the like having a moveable blowing jet along the leading edge corresponding to FIG. 3a;

FIG. 3c illustrates a third embodiment of a delta wing model and related experimental set-up with moveable blowing jet along the center body used in the examples;

FIGS. 4a and 4b show the interference of the blowing tube itself on the vortex breakdown location for the first embodiment with an angle of attack equal to 27°;

FIGS. 9a and 9b show the effect of moving blowing on vortex breakdown for the third embodiment ($C\mu$=0.0020, α=27°);

DETAILED DESCRIPTION OF THE PREFERRED EMBODIMENTS

Figure 1A:
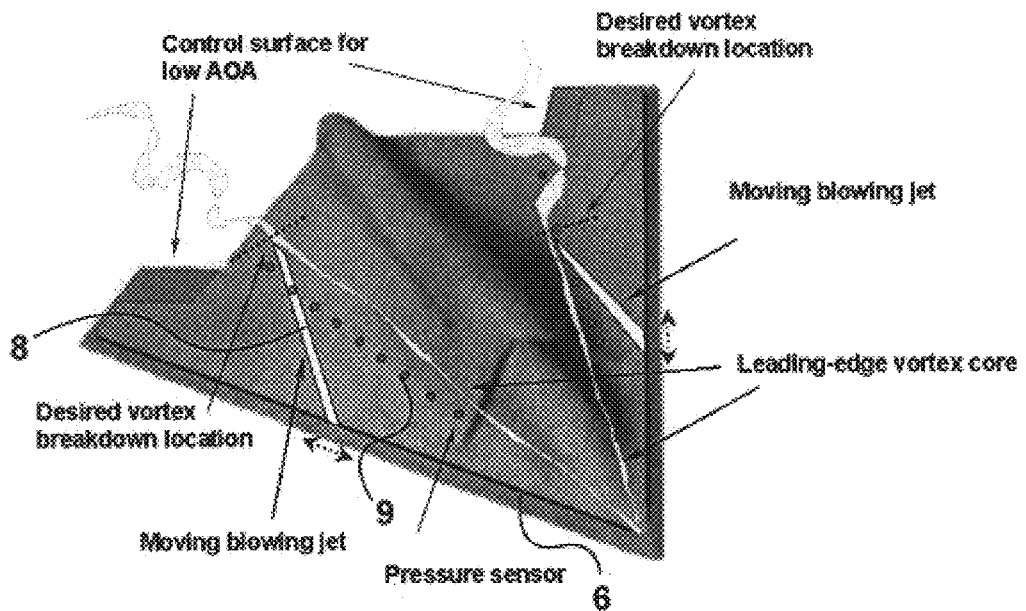
Figure 1B:
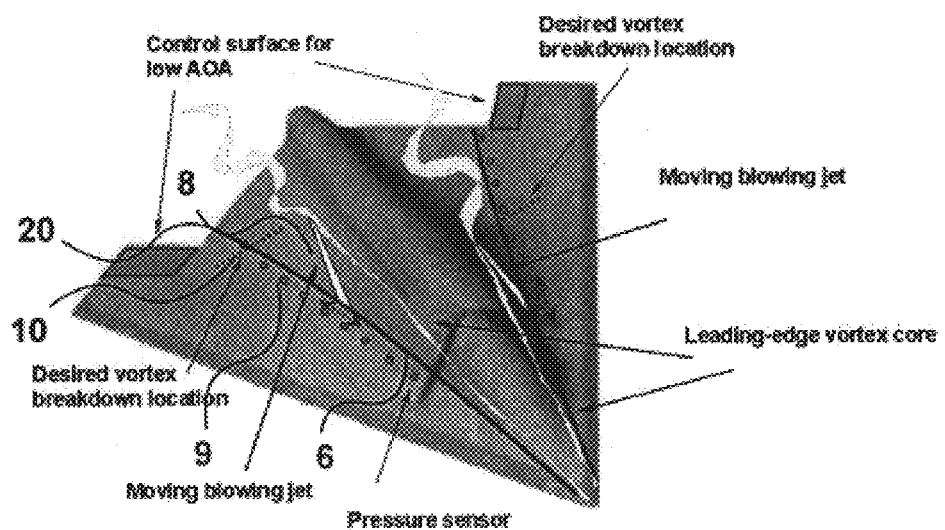
FIG. 1b is a perspective view of a super-maneuverable combat vehicle or the like having a moveable blowing jet on the wing surface corresponding to FIG. 3b.
Figure 1C:
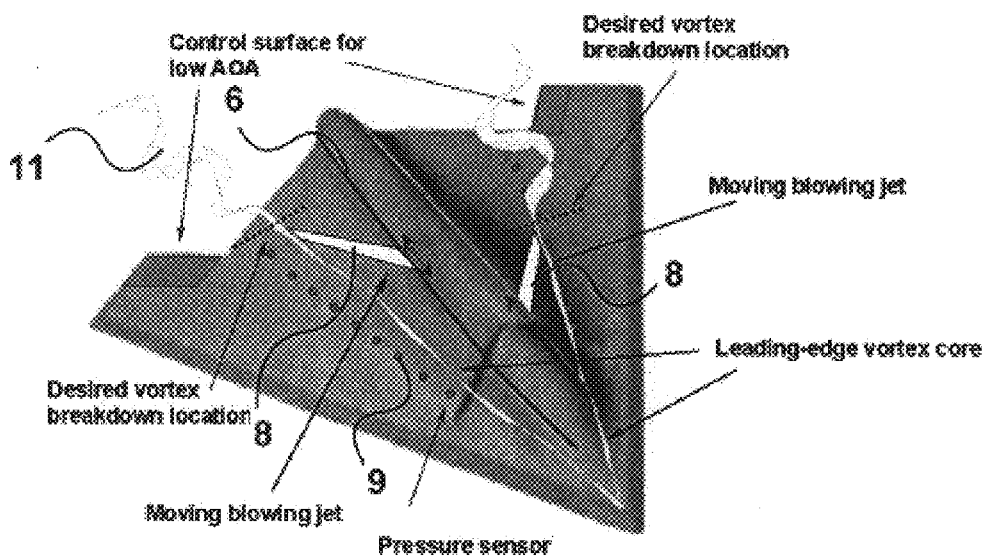
FIG. 1c is a perspective view of a super-maneuverable combat vehicle or the like having a moveable blowing jet along the fuselage corresponding to FIG. 3c.

The invention will be described with reference to its application to a super-maneuverable combat vehicle. FIGS.

1a to 1c show a blowing tube 6 extending respectively along the leading edge of the wing, a medial portion, and the central fuselage 7. The blowing tube 6 has moveable nozzle that creates a fluid jet 8 that is blown into the wing vortex and moves along the wing as the blowing tube slides along the tube 6. Alternatively, the blowing tube 6 can have a series of controlled nozzles along its length so as to permit the source of the fluid jet 8 to be displaced along the blowing tube. The source of the fluid jet is displaced so that that the fluid jet substantially follows the delayed vortex breakdown location. Typically, it is just slightly upstream.

The desired vortex breakdown location is shown at 10. The trailing vortex core is shown at 11. The source of the fluid jet 8 is displaced along track 6 so that the fluid jet always terminates just slightly upstream of the vortex breakdown location. The pressure sensors 9 are located on the wing surface and are used to detect the breakdown location. As vortex breakdown approaches, e.g. due to an angle of attack increase, the unsteady sensor signal becomes larger and its spectral content changes. This is used to adjust the blowing rate from the corresponding nozzle to ensure that breakdown remains behind it, thereby locking the breakdown location. Such an action could have a substantial effect on the super-maneuverable combat vehicle or the like.

Figure 2:
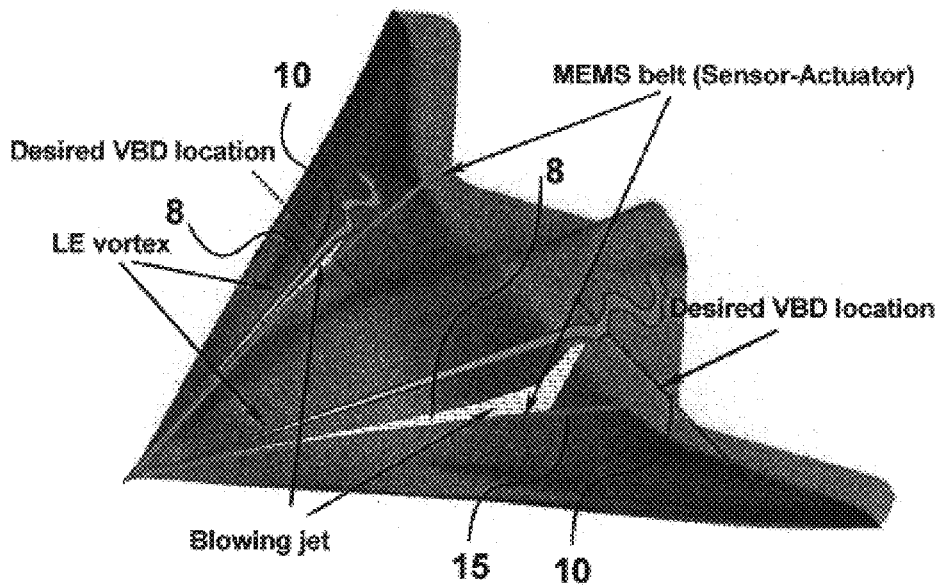
FIG. 2 is a perspective view of a super-maneuverable combat vehicle or the like employing MEMS with micro-pressure and moveable blowing jet.

The invention also may be implemented as a pressure sensor-actuator system of MEMS devices as shown in FIG. 2. In this embodiment, blowing jet 8 originates from a point on MEMS sensor-actuator belt 15. The MEMs devices act as actuators for valves controlling fluid flow.

In order to test the invention, experiments were conducted in a 15×20 in. water tunnel with a vertical return circuit. The freestream turbulence level was rated at $u/U_\infty < 1\%$. Care was exercised in ensuring that the turbulence screens were always free of trapped air bubbles and that a constant temperature of 22° C.~24° C. was maintained.

Figure 3A:
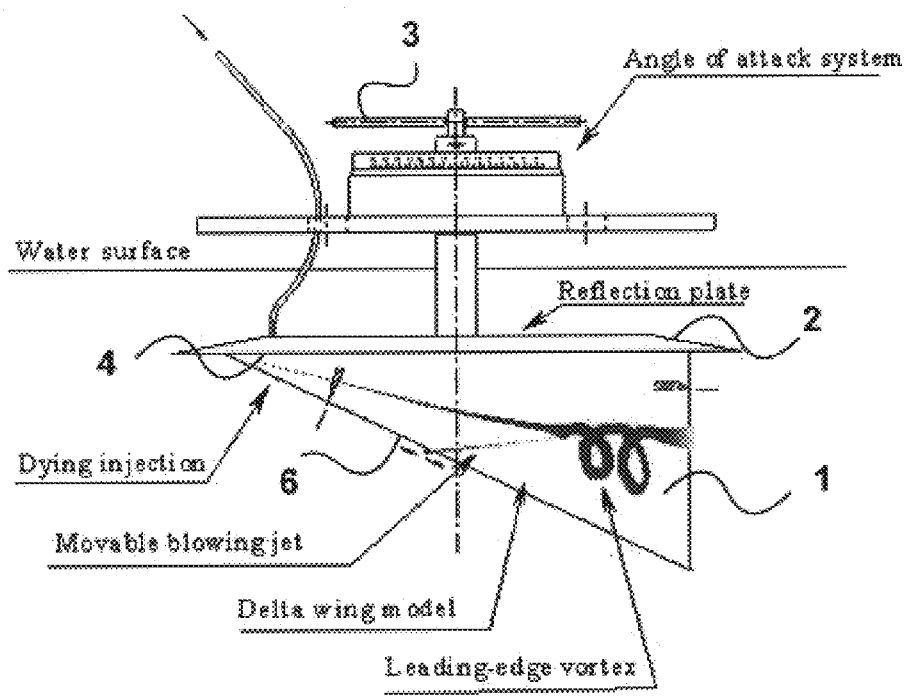
FIG. 3a illustrates a first embodiment of a delta wing model with moveable blowing jet along the leading-edge.
Figure 3B:
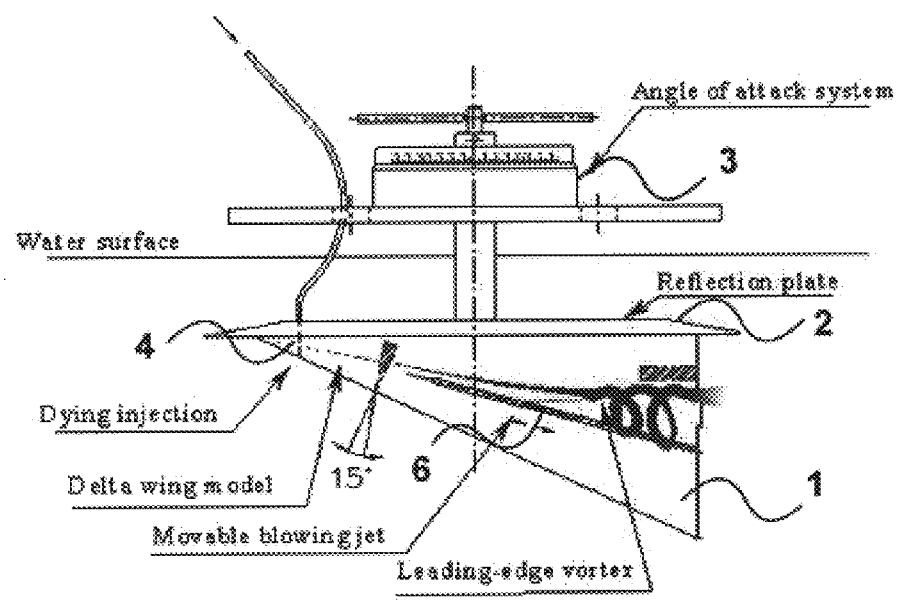
FIG. 3b illustrates a second embodiment of a delta wing model with moveable blowing jet on the surface of the wing used in the examples.

As shown in FIGS. 3a to 3c, a 65° delta wing half model 1 and a reflection plate 2 (located 2 in. below the water surface to avoid surface wave effects) were supported by a mechanism 3 for changing the angle of attack. Two 9 inch long models were tested: The first (FIGS. 3a, 3c) has a flat leeward surface and a 15° leading- and trailing-edge bevel on the windward surface, whereas the other (FIG. 3b), has a flat trailing edge.

In order to visualize the leading-edge vortex, dye was released from a 0.0156 in port 4 located at 6.9% root chord near the leading edge on the windward model surface. In the first embodiment the control blowing was applied with a wand having a 0.042 in inner diameter. In the second embodiment blowing was applied through a nozzle of the same diameter connected to a tube that can be moved along a dovetail shaped groove located under the vortex core on the upper wing surface. In the third embodiment the blowing nozzle can be moved along the center body. The nozzle aims back in the direction of the groove and 20 deg. away from the surface. The maximum blowing coefficient used in the tests was 0.0029.

The desired sensitive spots in the flow were determined by conducting tests at a free stream velocity of 5 in/s, corresponding to a Reynolds number of 30,000.

In order to assess the effectiveness of the blowing method in delaying vortex breakdown, the interference of the wand and nozzle in the absence of blowing on breakdown and the effect of blowing into various vortex regions were investigated. Specifically, the effect of blowing into the breakdown region, while following its motion, was investigated over a range of angles of attack and compared with the effect of blowing at fixed locations far forward, aft or near the breakdown region.

Figure 7A:
FIGS. 7a (no blowing tube) and 7b (blowing tube without blowing) show the interference of the blowing tube itself on the vortex breakdown location for the second embodiment with an angle of attack equal to 25°.
Figure 7B:
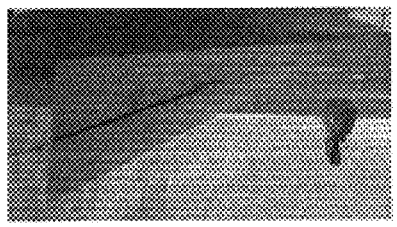
FIGS. 7c (no blowing tube) and 7d (blowing tube without blowing) show the interference of the blowing tube itself on the vortex breakdown location for the second embodiment with an angle of attack equal to 22°.
Figure 7C:
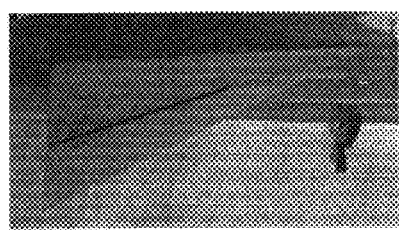
Figure 7D:
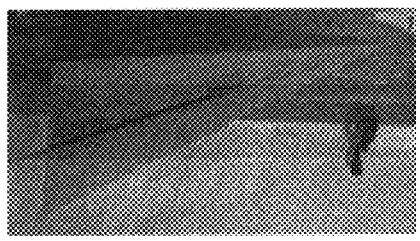
Figure 8A:
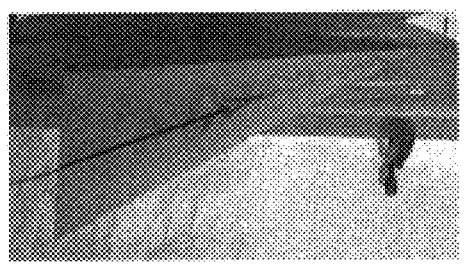
FIGS. 8a to 8d show the effect of moving blowing on vortex breakdown for the second embodiment ($C\mu$=0.0020, α=27°) in the same order as FIG. 6.
Figure 8B:
Figure 8C:
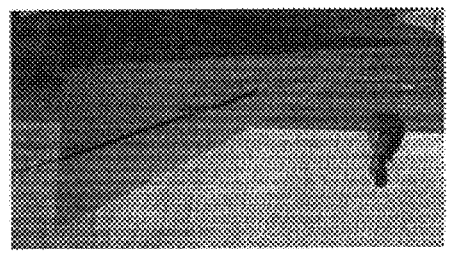
Figure 8D:

The influence of the nozzle without blowing on the vortex breakdown location is shown in FIGS. 4a (with no blowing tube) and 4b (with blowing tube, without blowing) and FIGS. 7a (with no blowing tube) and 7b (with blowing tube, without blowing), corresponding to the first and second embodiments respectively. Both pictures show that there is virtually no effect on the breakdown location due to the presence of the blowing devices that can thus be neglected. FIGS. 7c and 7d show the results for an angle of attack of 22°.

Figure 5A:
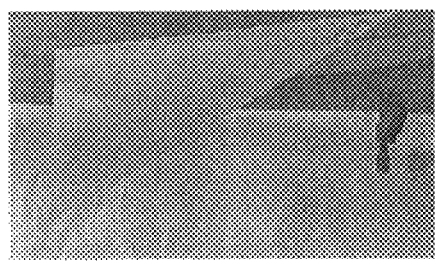
FIGS. 5a and 5b show the effect of a far upstream blowing location on vortex breakdown for the first embodiment ($C\mu$=0.0025, α=27°)
Figure 5B:
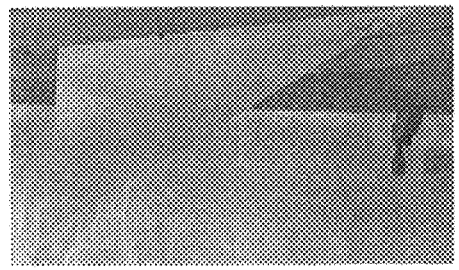
Figure 5C:
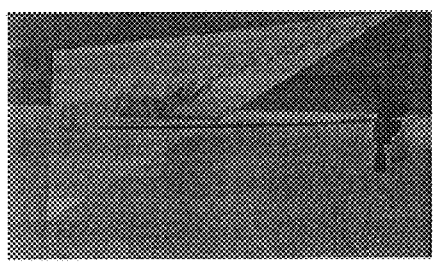
FIGS. 5c to 5d show the effect of a blowing location downstream of breakdown on vortex breakdown for the first embodiment ($C\mu$=0.0025, α=27°)
Figure 5D:
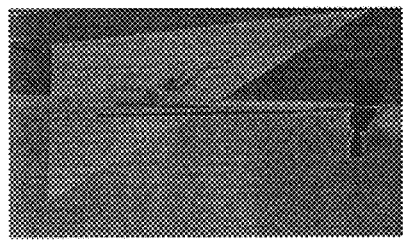
Figure 6A:
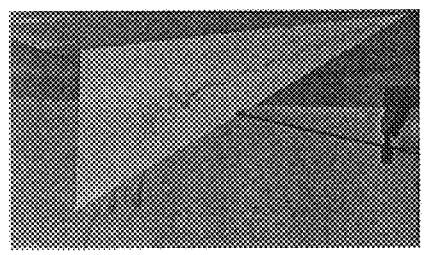
FIGS. 6a to 6d shows the effect of moving blowing on vortex breakdown for the first embodiment ($C\mu$=0.0025, α=27°), a) no blowing; b) far upstream, c) downstream, d) far downstream.
Figure 6B:
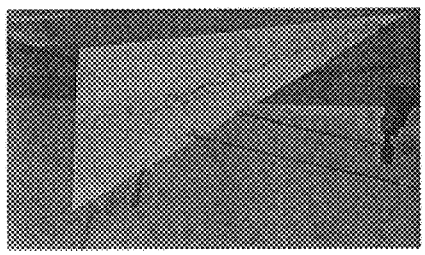
Figure 6C:
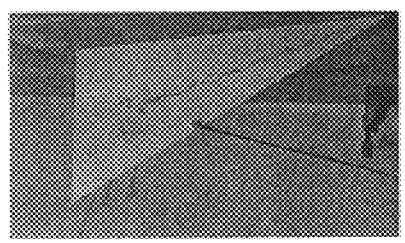
Figure 6D:
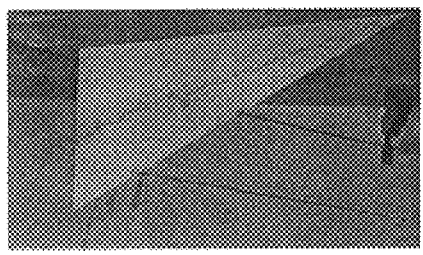

FIGS. 5a to 5d show the effects of fixed blowing location on vortex breakdown for the first embodiment. FIG. 5a shows no blowing, FIG. 5b shows far upstream blowing, FIG. 5c ($\Delta=1\tau$) shows downstream blowing, and FIG. 5d ($\Delta=2\tau$) shows far downstream blowing. When the blowing is applied far upstream of the breakdown location, the vortex is largely destroyed and there is only a small delay in breakdown location (FIG. 5b). When the breakdown is applied far downstream of the vortex breakdown, its effectiveness degrades and a much longer time is required for the breakdown to respond (FIGS. 5c and 5d). Similar results are found for the second and third embodiments as shown in FIGS. 6a to 6d and FIGS. 9a to 9d.

Figure 10:
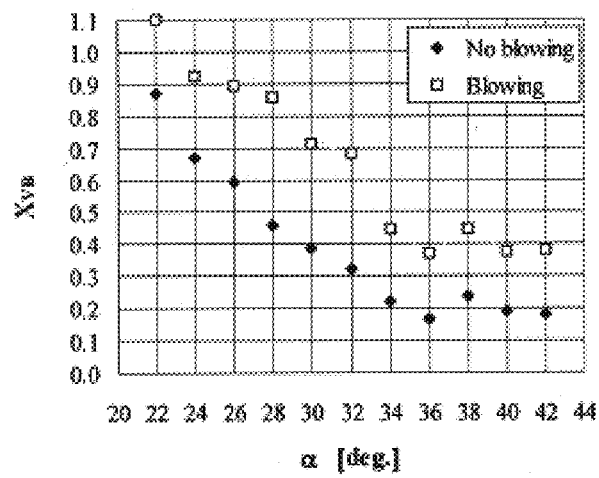
FIG. 10 shows the effects of blowing on breakdown at different angles of attack for the first embodiment ($C\mu$=0.0025)
Figure 11:
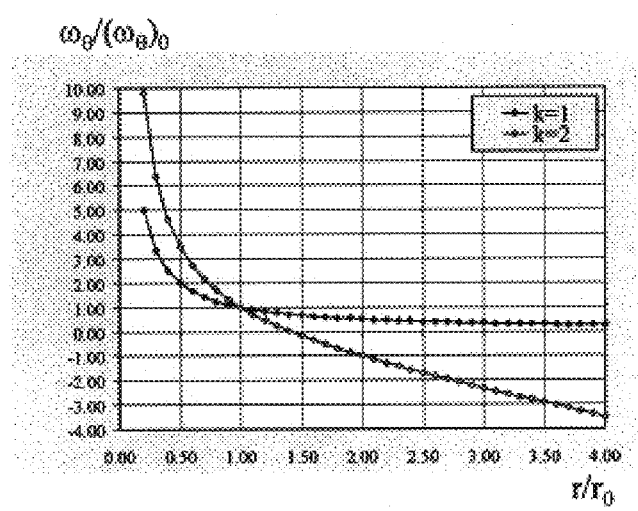
FIG. 11 shows the azimuthal vorticity vs. radius at different ratio of the velocity and vorticity helix angles.

The most effective results are obtained if the blowing location is displaced to follow the delayed breakdown location. In this case more than a 50% root chord delay in vortex breakdown location can be achieved with a much smaller blowing rate as shown in FIGS. 6a to 6d, FIGS. 8a to 8d, and FIGS. 9a to 9d for the first and second embodiments respectively. By taking the blowing rate into account the total effectiveness of this control method can be considerably higher than that of other approaches. FIG. 10 shows the maximum delay in breakdown at a fixed blowing coefficient of 0.0025 in the range $22 \leq \alpha \leq 42°$ for the first embodiment. As can be observed, the method is reasonably effective over the complete range. The above results show that the effectiveness of the blowing is a non-linear function of the distance between the blowing and breakdown locations.

When the nozzle is at a position immediately adjacent the leading edge (FIG. 3a) with a significant aft component, this breakdown point can be displaced aft by about 10%. An important finding is that if the blowing location follows the delayed breakdown location with a certain orientation; more than a 50% root chord delay in vortex breakdown location can be achieved as noted above with respect to FIG. 6 and FIG. 8. By taking the much smaller blowing rate into account the total effectiveness of this control method can be considerably higher than that of other approaches. As can be observed, the method is reasonably effective over the complete range.

The physical explanation for the observed behaviour is believed to be that there is non-linear and positive feed back region in the vicinity of vortex breakdown. In general, leading-edge vortex breakdown depends on the balance of vorticity feeding rate generated by the separation of the boundary layer at the leading edge and its downstream convection rate in the vortex. At the location where the vorticity convection rate is less than the vorticity feeding rate, the vortex core is forced to tilt to keep constant of the total angular momentum in the vortex tube resulting negative azimuthal vorticity. The tilted vortex and related negative azimuthal vorticity introduces a negative axial velocity so as an adverse pressure gradient which results in even negative azimuthal vorticity. This positive feed back leads vortex core spiraling out and its diameter rapidly increasing, eventually breaking down into large-scale turbulence.

The above physical explanation can be further understood by mathematical explanation.

For steady, inviscid and axisymmetric swirling flows the azimuthal vorticity on the stream surface is $$\frac{\omega_\theta}{(\omega_\theta)_0} = \frac{r_0}{r}\left(\frac{\tan\left(\frac{U_\theta}{U_x}\right)_0}{\tan\left(\frac{\omega_\theta}{\omega_x}\right)_0}\right) - \frac{r}{r_0}\left(\frac{\tan\left(\frac{U_\theta}{U_x}\right)_0}{\tan\left(\frac{\omega_\theta}{\omega_x}\right)_0} - 1\right) \quad (1)$$

where subscript 0 is assumed at some upstream station $x_0$. If $(\omega_{74})_0 \neq 0$, from Eq.(1)

$$\frac{d\omega_\theta}{dr} = \frac{-(\omega_\theta)_0}{r_0}\left[\left(\frac{r_0^2}{r^2}+1\right)\frac{\tan\left(\frac{U_\theta}{U_x}\right)_0}{\tan\left(\frac{\omega_\theta}{\omega_x}\right)_0} - 1\right] \quad (2)$$

As examples, FIG. 10 illustrates the development of azimuthal vorticity under two different ratios, $$k = \tan\left(\frac{U_\theta}{U_x}\right)_0 \bigg/ \tan\left(\frac{\omega_\theta}{\omega_x}\right)_0 = 1 \text{ and } 2.$$

At the condition of $k \geq 1$, for a given $(\omega_\theta)_0$, $\omega_\theta$ becomes negative for sufficiently large stream surface, $r/r_0$, and remain negative on a diverging stream surface. At this condition, the axial velocity, $U_x$, will decrease due to negative azimuthal vorticity since:

$$U_x(0, x) = \frac{1}{2}\int_{-\infty}^{\infty}\int_0^\infty \frac{r^2 \omega_\theta(r, \hat{x})}{[r^2 + (x - \hat{x})^2]^{3/2}} dr d\hat{x} \quad (3)$$

From Eq. (1), this reduced axial velocity, $U_x$, will further induce more negative azimuthal vorticity, $\omega_\theta$. If this positive feed back continues this process will eventually break down the vortex.

Figure 12:
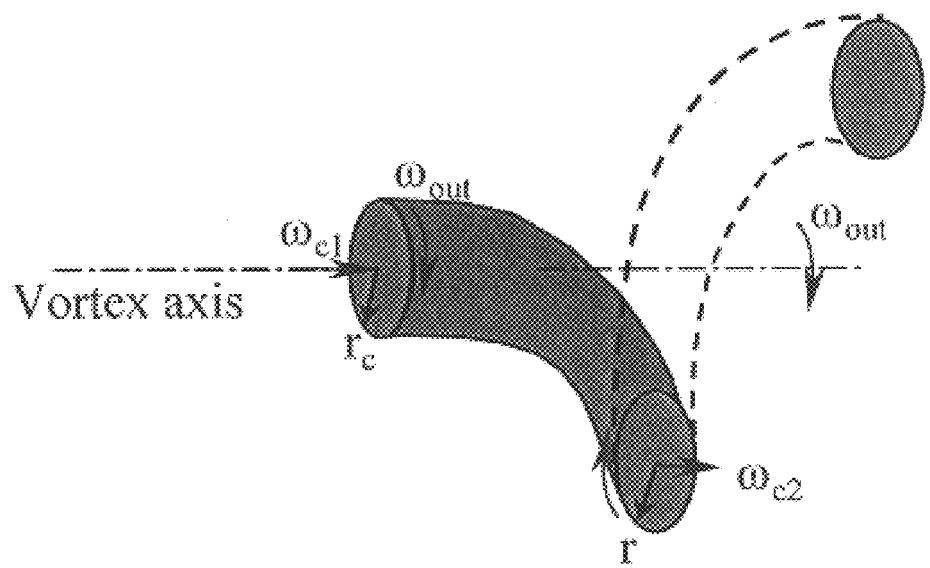
FIG. 12 illustrates momentum conservation in spiral vortex breakdown region.

For three-dimensional spiral vortex breakdown, the positive feedback is even stronger since the vortex core does not rotate around its original axis. As illustrated in FIG. 12, in this case and applying momentum conservation equation in $\Omega_x$:

$$\frac{1}{2}mr_c^2\Omega_{x1} = \frac{1}{2}mr_c^2\Omega_{x2} + mr^2\Omega$$

If $\Omega = \frac{1}{3}\Omega_{x1}$ and $r = r_c$ then $\Omega_{x2} = \frac{1}{3}\Omega_{x1}$.

which shows the even larger reduction in angular velocity about the local spiraling vortex axis compare with axisymmetric flow.

Figure 13:
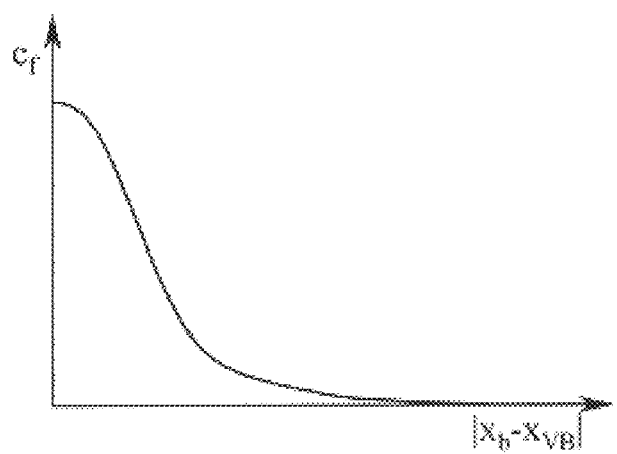
FIG. 13 shows the feedback coefficient in the breakdown region.
Figure 14A:
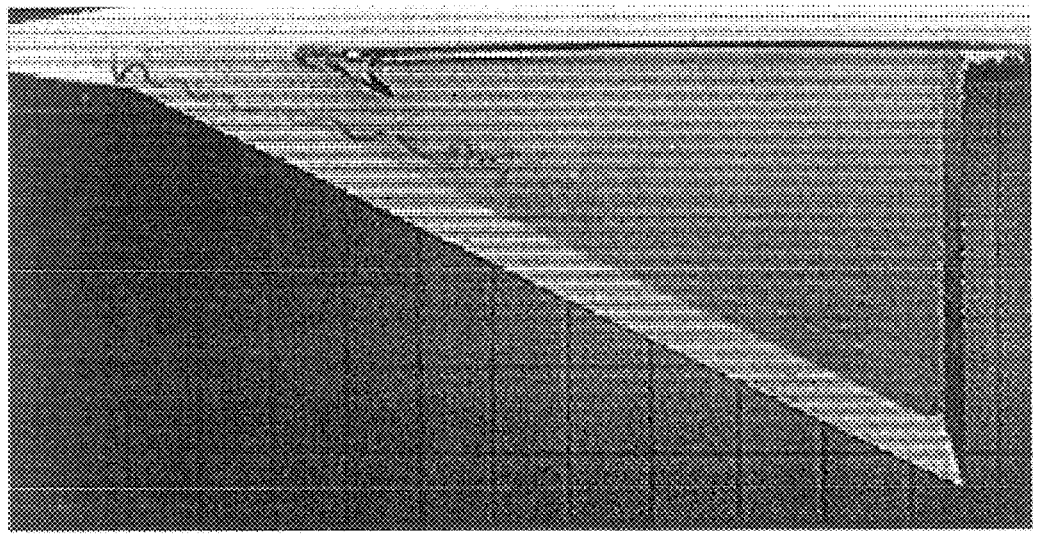
FIGS. 14a to 14d show the effect of jet orientation on vortex breakdown.
Figure 14B:
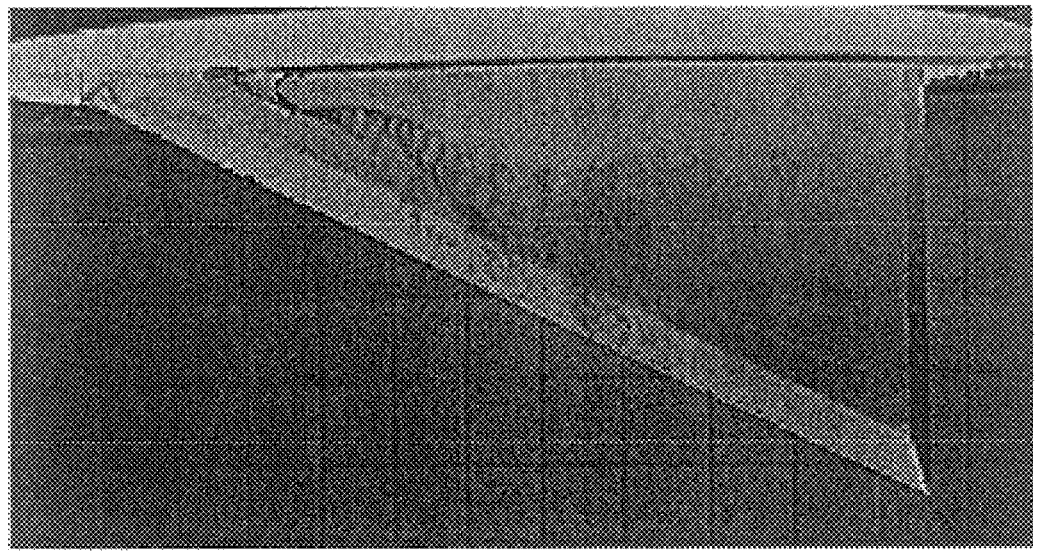
Figure 14C:
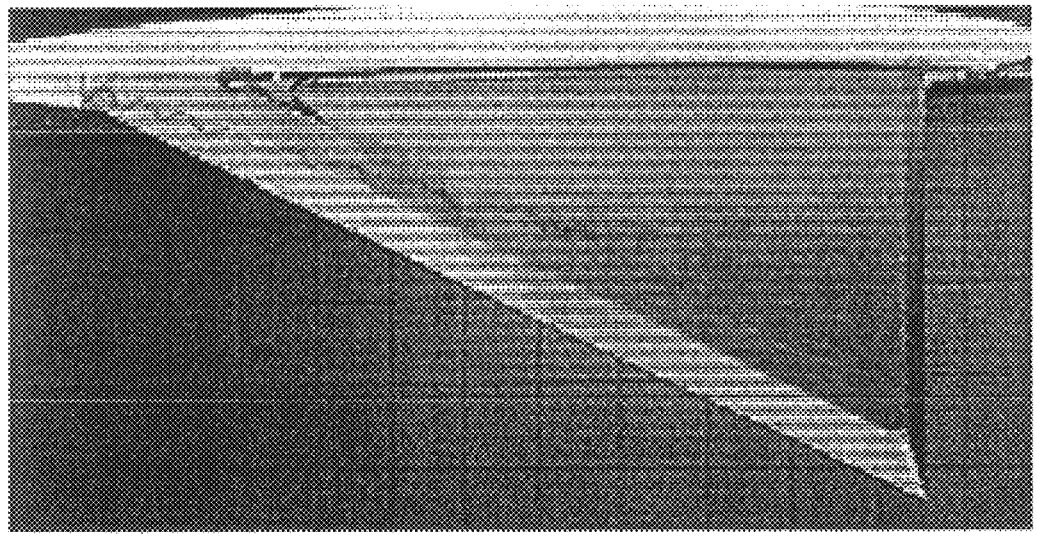
Figure 14D:
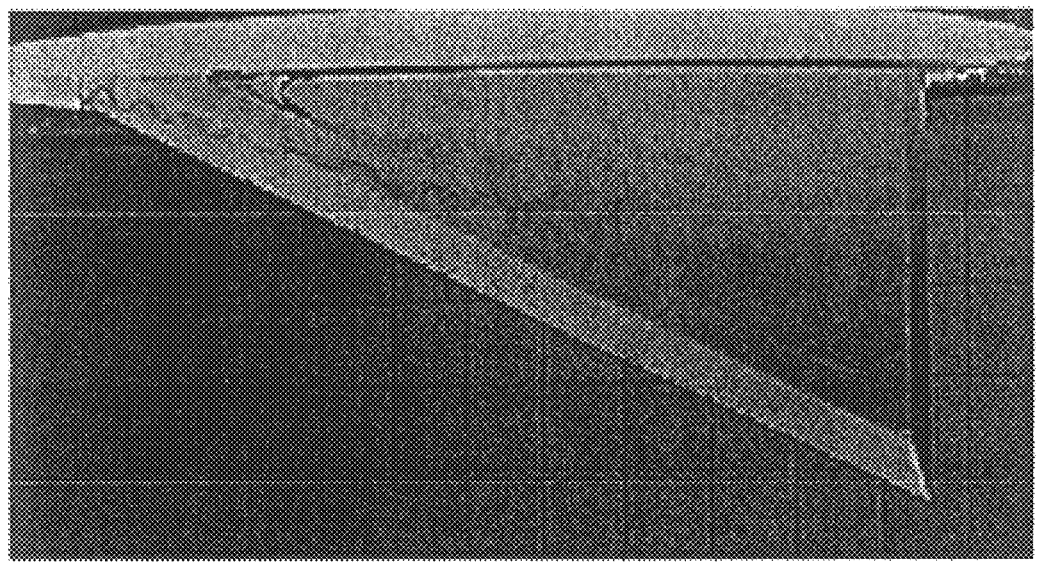

The foregoing discussion demonstrates that, due to the above-mentioned positive feedback, the location of breakdown is particularly sensitive to perturbations in the flow in the region close to the vortex kink point. The sensitivity of the breakdown response to blowing at different stations but fixed orientation can thus be represented by a function such as shown in FIG. 13.

In order to stop the positive feed back in the swirling flows two equations are worthwhile to be studied. The first equation is Eq.(1) and the second is azimuthal vorticity transport equation. For steady, inviscid and axisymmetric swirling flows, the azimuthal vorticity component is $$\frac{D\omega_\theta}{Dt} = \left(\omega_r \frac{\partial U_\theta}{\partial r}\right)_t - \left(\frac{U_\theta \omega_r}{r}\right)_t + \left(\omega_x \frac{\partial U_\theta}{\partial x}\right)_t + \left(\frac{U_r \omega_\theta}{r}\right)_s \quad (5)$$

The subscript "t" and "s" represent vortex tilting and stretching respectively. The first and second tilting terms correspond to the rotation of radial vorticity, $\omega_r$, into the azimuthal direction while the third term represents the tilting of axial vorticity, $\omega_x$, by an axial gradient of the swirl velocity, $u_\theta$. Since in the vortex filament $\omega_x >> \omega_\theta$ and $\omega_r$, the above equation can be further simplified as $$\frac{D\omega_\theta}{Dt} \approx \omega_x \frac{\partial U_\theta}{\partial x} \quad (6)$$

By blowing with an aft component into the vortex core in the breakdown region, the local $U_x$ will increases. According to Eq.(1) it will reduce the absolute value of negative azimuthal vorticity resulting further recovery of axial velocity. Furthermore, if the blowing is in the orientation which introduces $U_\theta$ in the same rotational direction as the vortex, then $$\frac{\partial U_\theta}{\partial x} > 0$$

which also leads to a reduction in the absolute value of negative azimuthal vorticity, resulting in a decrease in k and forcing its value to be less than 1. FIGS. 14a to 14d show the effect of different jet orientations. These two facts will move breakdown aft of this location.

Figure 15:
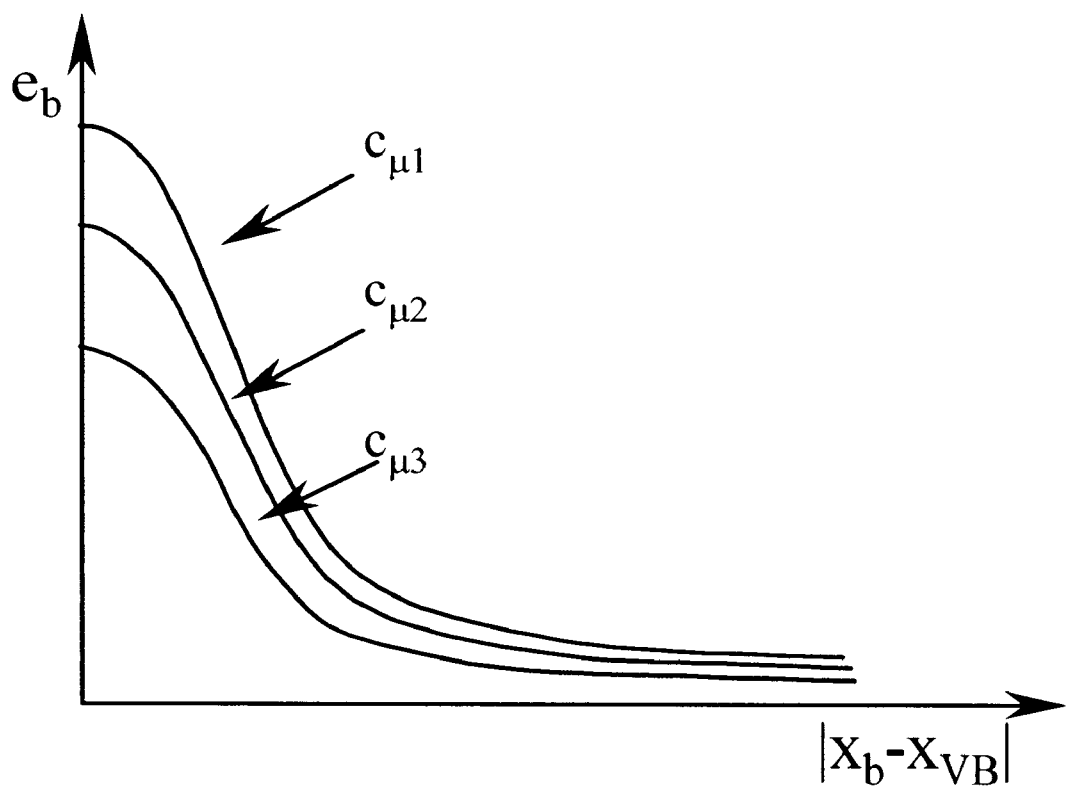
FIG. 15 shows the blowing efficiency vs. relative blowing location at fixed orientation of the blowing tube.

From above discussion, when $$\frac{\partial U_\theta}{\partial x} > 0,$$

the effectiveness of blowing largely depends on the distance between the blowing and breakdown locations, blowing orientation and blowing rate, as illustrated in FIG. 15 for constant orientation and different blowing rate. If blowing is applied too far upstream of breakdown the flow is inherently very stable without the above mentioned positive feed back process. Such tiny amount of power added to the system will be subsequently distributed and dissipated and will not cause sufficient local flow changes. On the other hand, if the blowing point is far downstream of breakdown, a great deal of power and considerable time are required to reorganize the turbulent flow.

It will be apparent to one skilled in the art that numerous variants of the present invention may be made within the scope of the appended claims.

I claim:

1. A method of controlling a leading edge vortex on an airplane wing comprising:

blowing a fluid jet into, or sucking a fluid jet out of, a fluid flow field adjacent a surface of said wing, said fluid jet having a source displaceably located on said airplane wing so as to be moveable over said surface;

continually identifying a sensitive spot in a region of said fluid flow field displaced from a vortex breakdown region where the control power required to strengthen or destroy said vortex is a non linear function of the distance between said fluid jet and said breakdown region, and dynamically displacing said source of said fluid jet along a predetermined path extending over said airplane wing as said vortex breakdown region moves over said airplane wing to continually direct said jet onto said sensitive spot and thereby control the position of said breakdown region.

2. A method as claimed in claim 1, wherein said source is provided by a nozzle displaceable along said predetermined path extending along said airplane wing.

3. A method as claimed in claim 1, wherein said source is provided by one of a series of nozzles arranged along said predetermined path, and said source of the fluid jet is displaced by switching fluid flow between nozzles.

4. A method as claimed in claim 1, wherein said fluid jet terminates slightly upstream of the vortex breakdown region.

5. A method as claimed in claim 1, wherein said sensitive spot is identified by monitoring said vortex breakdown region with an array of pressure sensors.

6. A method as claimed in claim 1, wherein said path extends along a leading edge of said airplane wing.

7. A method as claimed in claim 1, wherein said path extends along a medial portion of said airplane wing.

8. A method as claimed in claim 1, wherein said path extends along an inner portion of said airplane wing adjacent or on a fuselage attached thereto.

9. A method as claimed in claim 1, wherein said source of said jet is mounted on a track provided on said airplane wing.

10. A method as claimed in claim 9, wherein said source is a moveable nozzle.

11. A method as claimed in claim 1, wherein said source comprises an array of MEMS (Micro Electro Mechanical Systems) devices positioned on said wing.

12. A method as claimed in claim 1, wherein a blowing parameter for said fluid jet is also controlled to assist in continually directing said fluid jet onto said sensitive spot.

13. A method as claimed in claim 12, wherein said blowing parameter is continually adjusted to obtain maximum positive feedback.

14. A method as claimed in claim 12, wherein said blowing parameter comprises the blowing mass flow rate.

15. A method as claimed in claim 12, wherein said blowing parameter is the wave number of a synthetic jet.

16. A method as claimed in claim 1, wherein the sensitive spot is identified in accordance with a predetermined control law.

17. A method as claimed in claim 1, wherein said sensitive spot is selected such that low level blowing causes significant movement of the breakdown region.

18. An arrangement for controlling a leading edge vortex on an airplane wing, comprising:
 at least one sensor for developing a signal identifying a sensitive spot in a non-linear region displaced from a breakdown region where vortex breakdown of said vortex occurs and where the control power required to strengthen or destroy said vortex is a non linear function of the distance between said fluid jet and said breakdown region; and
 a fluid jet generator for generating a fluid jet that can be blown into or sucked out of said non-linear region to displace said vortex breakdown to a target location, said fluid jet generator being continually displaceable along a predetermined path over a surface of said airplane wing to direct said fluid jet into said sensitive spot in said fluid flow field near the vortex breakdown region and thereby control the position of said vortex breakdown region.

19. An arrangement as claimed in claim 18, wherein said fluid jet generator comprises a nozzle moveable along said path.

20. An arrangement as claimed in claim 19, wherein said airplane wing is a delta wing.

21. An arrangement as claimed in claim 18, wherein said fluid jet generator comprises a series of individually controllable nozzles fixed along said path.

22. An arrangement as claimed in claim 18, wherein said path extends along a leading edge of said airplane wing.

23. An arrangement as claimed in claim 18, wherein said path extends along a medial line on said airplane wing.

24. An arrangement as claimed in claim 18, wherein said path extends along an inner portion of said airplane wing adjacent or on a fuselage attached thereto.

25. An arrangement as claimed in claim 18, wherein a blowing parameter of said fluid jet is adjusted in response to said signal to assist in continually directing said fluid jet onto said sensitive spot.

26. An arrangement as claimed in claim 25, wherein said parameter is the blowing mass flow rate.

27. An arrangement as claimed in claim 25, wherein said jet is a synthetic jet and said blowing parameter is the wave number thereof.

* * * * *